US012777513B2

(12) United States Patent
Ginthoer et al.

(10) Patent No.: US 12,777,513 B2
(45) Date of Patent: Oct. 27, 2026

(54) METHOD FOR SCHEDULING A DATA PACKET

(71) Applicant: Robert Bosch GmbH, Stuttgart (DE)

(72) Inventors: David Osamu Ginthoer, Stuttgart (DE); Tobias Siegel, Seeheim-Jugenheim (DE)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 18/564,213

(22) PCT Filed: May 25, 2022

(86) PCT No.: PCT/EP2022/064353
§ 371 (c)(1),
(2) Date: Nov. 27, 2023

(87) PCT Pub. No.: WO2022/248636
PCT Pub. Date: Dec. 1, 2022

(65) Prior Publication Data
US 2024/0251434 A1 Jul. 25, 2024

(30) Foreign Application Priority Data
May 28, 2021 (DE) ..................... 10 2021 205 449.8

(51) Int. Cl.
*H04W 72/543* (2023.01)
*H04W 28/02* (2009.01)
*H04W 72/1263* (2023.01)

(52) U.S. Cl.
CPC ..... *H04W 72/543* (2023.01); *H04W 28/0252* (2013.01); *H04W 72/1263* (2013.01)

(58) Field of Classification Search
CPC ............... H04L 1/0003; H04L 1/0009; H04W 28/0252; H04W 72/0446; H04W 72/12;
(Continued)

(56) References Cited

U.S. PATENT DOCUMENTS 8,811,407 B1 * 8/2014 Carothers ............ H04L 47/629 370/395.43
10,285,175 B2 * 5/2019 Au ........................ H04W 72/23
(Continued)

FOREIGN PATENT DOCUMENTS

CN 102300326 A 12/2011
CN 102932946 A 2/2013
(Continued)

OTHER PUBLICATIONS

Translation of International Search Report for Application No. PCT/EP/2022/064353 dated Sep. 14, 2022 (1 page).
(Continued)

*Primary Examiner* — Eric Nowlin
(74) *Attorney, Agent, or Firm* — Michael Best & Friedrich LLP

(57) ABSTRACT

The invention relates to a method for scheduling a data packet ($f_{u1}$, $f_{u2}$, $f_{d1}$, $f_{d2}$) for a cyclical wireless communication in a communication system, wherein one cycle of the communication comprises transferring a first data packet ($f_{u1}$, $f_{u2}$) on a first communication channel (38, 42) from a first end point (24, 26) to a second end point (20, 22) and transferring a second data packet ($f_{d1}$, $f_{d2}$) on a second communication channel (40, 44) from the second end point (20, 22) to the first or a third end point (24, 26) and the second data packet ($f_{d1}$, $f_{d2}$) is scheduled on the basis of the cycle information relating to the cycle and first channel information relating to the first communication channel (38, 42) and/or the first data packet ($f_{u1}$, $f_{u2}$) is scheduled on the basis of the cycle information and second channel information relating to the second communication channel (40, 44).

10 Claims, 3 Drawing Sheets

(58) Field of Classification Search
CPC ............. H04W 72/543; H04W 72/569; H04W 72/1263
See application file for complete search history.

(56) References Cited

U.S. PATENT DOCUMENTS

| | | | | |
|---|---|---|---|---|
| 10,575,364 | B2 * | 2/2020 | Ohlsson | H04W 76/28 |
| 10,834,707 | B2 * | 11/2020 | Hua | H04W 72/20 |
| 11,122,483 | B2 * | 9/2021 | Chen | H04W 68/02 |
| 11,259,324 | B2 * | 2/2022 | Abouelseoud | H04W 74/02 |
| 11,483,209 | B2 * | 10/2022 | Kelley | H04L 41/0894 |
| 11,510,183 | B2 * | 11/2022 | Hua | H04W 72/1263 |
| 2008/0002646 | A1 | 1/2008 | Hannu et al. | |
| 2015/0200828 | A1 * | 7/2015 | Liu | H04L 43/0894 370/252 |
| 2018/0249464 | A1 * | 8/2018 | Au | H04W 72/23 |
| 2019/0037552 | A1 * | 1/2019 | Hua | H04W 72/1263 |
| 2021/0007137 | A1 * | 1/2021 | Abouelseoud | H04W 74/02 |
| 2021/0045104 | A1 * | 2/2021 | Hua | H04W 72/1263 |
| 2021/0076450 | A1 * | 3/2021 | Jiang | H04W 76/28 |
| 2021/0266940 | A1 * | 8/2021 | Pezeshki | H04W 72/20 |
| 2021/0345376 | A1 * | 11/2021 | Kwon | H04W 76/28 |
| 2024/0155581 | A1 * | 5/2024 | Li | H04L 5/0092 |

FOREIGN PATENT DOCUMENTS

| | | | | | |
|---|---|---|---|---|---|
| CN | 104661264 | A | | 5/2015 | |
| CN | 111182628 | A | | 5/2020 | |
| CN | 112425254 | A | * | 2/2021 | H04W 72/23 |
| CN | 115623598 | A | * | 1/2023 | H04L 5/0053 |
| CN | 112425254 | B | * | 3/2023 | H04W 72/23 |
| EP | 4354997 | A1 | * | 4/2024 | H04L 5/0053 |
| WO | WO-2023284485 | A1 | * | 1/2023 | H04L 5/0053 |

OTHER PUBLICATIONS

ETSI, "3GPP TS 38.300 NR and NG-RAN Overall Description; Stage-2 Version 16.4.0," Technical Specification © 2021 (151 pages).

ETSI, "3GPP TS 23.501 System Architecture for the 5G System (5GS); Version 16.7.0," Technical Specification © 2021 (452 pages).

ETSI, "3GPP TS 38.321 Medium Access Control (MAC) Protocol Specification; Version 16.3.0," Technical Specification © 2021 (158 pages).

Ginthor et al., "Survival Time-aware Dynamic Multi-connectivity for Industrial Control Applications," 22nd IEEE International Conference on Industrial Technology (ICIT), 2021, vol. 1, pp. 1193-1199.

* cited by examiner

METHOD FOR SCHEDULING A DATA PACKET

BACKGROUND OF THE INVENTION

The invention relates to a method and a computing unit for scheduling a data packet for cyclic wireless communication in a communication system. The present invention also relates to a base station with the computing unit, a terminal device, a computer program and a computer-readable data carrier.

In communication systems in accordance with the 3GPP standards, wireless data transfer in the uplink and downlink directions is independent of each other. This means that no information about the status of the downlink channel is provided to the uplink scheduler and no information about the status of the uplink channel is provided to the downlink scheduler, see for example the technical specification according to 3GPP standard "TS 38.300 NR; NR and NG-RAN Overall Description; Stage 2 V16.4.0" with upload date 2021-01-06.

The known methods for scheduling are usually designed adaptively to meet the requirements with regard to quality of service, i.e., the prioritization and allocation of resources takes place taking into account current transfer statistics on the respective communication channel, e.g., in the form of the current data transfer rate or the current packet error rate.

It is also known to signal Time-Sensitive Communication Assistance Information (TSCAI) for time-critical applications of a base station designed as a gNodeB. This allows the scheduler of the gNodeB to take into account important parameters for time-critical data transfer, e.g., a direction of data transfer (uplink or downlink), a periodicity or time interval between two bursts or a burst arrival time, see the technical specification according to 3GPP standard "TS 23.501; System architecture for the 5G System (5GS); V16.7.0" with upload date: Dec. 17, 2020.

SUMMARY OF THE INVENTION

According to a first aspect, the present invention relates to a method for scheduling a data packet for a cyclic wireless communication in a communication system, in particular in a mobile radio communication system. A communication cycle comprises transferring a first data packet on a first communication channel from a first end point to a second end point and transferring a second data packet on a second communication channel from the second end point to the first or a third end point. In particular, the transfer, especially sending, of the second data packet takes place after the transfer, especially reception, of the first data packet. The communication cycle therefore comprises in particular a defined time sequence or sequence of the transfer of the first data packet and the second data packet.

According to the invention, the scheduling of the second data packet takes place as a function of a cycle information relating to the cycle and a first channel information relating to the first communication channel. According to the invention, the first data packet is alternatively or additionally scheduled as a function of the cycle information and a second channel information relating to the second communication channel.

According to a second aspect, the present invention relates to a computing unit comprising a scheduling module for scheduling a data packet for a cyclic wireless communication in a communication system.

The scheduling module of the computing unit is configured for scheduling the second data packet as a function of a cycle information relating to the cycle and a first channel information relating to the first communication channel. Alternatively or additionally, the scheduling module of the computing unit is configured for scheduling the first data packet as a function of the cycle information and a second channel information relating to the second communication channel.

According to a third aspect, the present invention relates to a base station, in particular a gNodeB, with a computing unit according to the second aspect.

According to a fourth aspect, the present invention relates to a user device or user equipment for cyclic wireless communication in a communication system. The first or second end point is assigned to the user device. According to the third aspect, the user device is configured to provide a base station with cycle information relating to the cycle of the communication. The user device is further configured to transfer, in particular send and/or receive, the first and/or second data packet based on the scheduling performed by the base station according to the method according to the first aspect.

According to a further aspect, the invention relates to a computer program or a computer program product comprising instructions which, when executed by a computer or a computing unit or a base station, cause the latter to execute and/or control the method according to the first aspect of the invention, and to a computer-readable data carrier on which the computer program is stored. The computer-readable or machine-readable data carrier can be, for example, a storage medium such as a semiconductor memory, a hard disk memory or an optical memory.

The communication system preferably comprises a core network, a base station and at least one user device. The communication system is designed for wireless communication between the user device and the base station. The wireless communication is preferably a mobile radio communication, in particular according to the 3GPP standard, e.g., according to Release 15 or 16.

The first end point of the cycle and/or the second end point of the cycle and/or the third end point of the cycle can each be an end point on the user device side or on the network side. An end point on the user device side is an end point assigned to the user device. A network-side end point is an end point assigned to the core network.

The second end point of the cycle is preferably a user device-side end point if the first end point is a network-side end point. Alternatively, it is preferred if the second end point of the cycle is a network-side end point when the first end point is a user-device-side end point.

The third end point of the cycle is preferably an end point on the user device side if the first end point is an end point on the user device side. Alternatively, the third end point of the cycle can be a network-side end point if the first end point is a network-side end point.

The first and second communication channels each comprise a radio channel, in particular a mobile radio channel. For this purpose, the first and second communication channels are preferably each assigned a radio interface, in particular a mobile radio interface. In other words, the transfer of the first and second data packets takes place at least in part via a radio connection, in particular a mobile radio connection.

It is conceivable that the first communication channel comprises an uplink channel and the second communication channel comprises a downlink channel. It is also conceivable that the first communication channel comprises a downlink channel and the second communication channel comprises an uplink channel. The uplink channel can, for example, comprise a PUCCH (Physical Uplink Control Channel) and a PUSCH (Physical Uplink Shared Channel). The downlink channel can, for example, comprise a PDCCH (Physical Downlink Control Channel) and a PDSCH (Physical Downlink Shared Channel).

The cycle of communication can be part of an application based on a periodic exchange of information between the first and the second and optionally the third end point. The cycle of communication can be repeated periodically, in particular with a periodicity based on the application.

Preferably, a content, in particular user data, of the second data packet is based on a content, in particular user data, of the first data packet. The user data of the second data packet is particularly preferably based on the user data of the first data packet evaluated after the transfer of the first data packet. In other words, the second data packet is correlated or dependent on the content of the first data packet.

The user data of the first data packet can be provided by the application. The user data of the second data packet can be provided to the application. For example, the application can be a machine that is controlled by a control unit wirelessly connected to the machine by the communication system.

It is conceivable that the first data packet comprises sensor data. It is also conceivable that the second data packet comprises feedback data or control data, which is generated or determined based on the sensor data. Alternatively, it is conceivable that the first data packet comprises control data and the second data packet comprises sensor data, which is recorded or provided based on the control data.

The cycle information comprises information relating to the cycle to be taken into account when scheduling the first and/or second data packet. In particular, the cycle information can be based on information or a request from an application comprising the cycle or an application on which the cycle is based.

If there is a time sequence of several cycles one after the other, it is conceivable that the cycle information is provided individually for each of the cycles. Alternatively, it is also conceivable that the cycle information for the multiple cycles is provided once.

The cycle information preferably comprises an indication regarding an assignment of the second data packet to the first data packet or a dependency of the second data packet on the first data packet. Such information can comprise an identity specification, e.g., an identification number, for the first and second data packet respectively.

The cycle information can also comprise an indication of the end points of the communication system between which the first and second data packets are transferred and/or the time sequence in which they are transferred. The cycle information can also comprise an indication of the periodicity with which the cycle is executed. The cycle information may also comprise an indication of a packet size of the first and/or second data packet.

In addition, the cycle information can comprise a requirement of an application on which the cycle is based with regard to quality of service, e.g., a minimum data rate, a maximum packet error rate, a jitter, a maximum data rate, a priority value of the application.

The cycle information may further comprise information relating to a classification of a criticality of the application and/or, in the case of data packet sizes varying between the cycles, information relating to a size range of the first and/or second data packet.

It is also conceivable that the cycle information comprises a time specification relating to the receipt of the first and/or second data packet. The time specification can comprise an absolute time for a time of receipt or a relative time up to the latest permitted receipt of the data packet. A data packet received after the time of receipt is considered worthless by the application, so that the cycle is not considered successfully completed. The time specification can, for example, be defined via a burst arrival time, e.g., covered by a TSCAI, and a predefined application-specific packet delay budget.

The time information can, for example, comprise a latest permitted arrival time of the first and/or second data packet at the base station (e.g., burst arrival time or burst arrival time plus a predefined packet delay budget), wherein in particular a data packet that does not or cannot reach the base station within the latest permitted arrival time is discarded. The time information may alternatively or additionally comprise an indication of an arrival time of the first data packet at the second end point and/or of the second data packet at the first or third end point.

The time specification may additionally or alternatively comprise a survival time of the application on which the cycle is based. The survival time of the application represents the maximum permitted time between two successive successful runs or executions of the cycle. The cycle can only be completed or executed successfully if the first data packet and the second data packet are transferred on time. If the survival time is exceeded without successfully completing a cycle, the application on which the cycle is based will fail. The survival time therefore characterizes the tolerance of the application with regard to successive losses of data packets.

In the context of the present invention, channel information relating to a communication channel can be understood as information that represents a state or a status of the communication channel and/or a state or a status of a data transfer on the communication channel. The channel information can comprise one or more measured variables relating to the state or status of the communication channel and/or the data transfer and/or represent one or more of these measured variables.

It is conceivable that the channel information represents a past and/or current and/or expected transfer quality on the communication channel, for example averaged over a predefined number of transfers. It is also conceivable that the channel information takes into account transfer statistics of data packets transferred on the communication channel. The channel information may alternatively or additionally comprise a transfer quality averaged over the first and second communication channel and/or a worst-case transfer quality with regard to a transfer on the first and second communication channel.

The transfer quality can be a utilization and/or a particularly achievable data rate and/or a spectral efficiency and/or a bandwidth of the communication channel. It is also conceivable that the transfer quality represents a number of packet losses on the communication channel. For example, the transfer quality can comprise a status of a repeat transfer, in particular a HARQ status (Hybrid Automatic Repeat Request).

The channel information of the communication channel can represent a state or status of the transfer of the respective data packet on the respective communication channel. It is conceivable that the channel information represents information as to whether the respective data packet is already being transferred on the respective communication channel or will be transferred with at least a predefined probability of success or whether transfer of the respective data packet on the respective communication channel is not possible or has failed.

In the context of the present invention, scheduling can be understood as a method in which a data packet is assigned a priority for transfer by means of the radio interface, in particular between the user device and the base station, in order to generate a time sequence of the data packets to be transferred on the communication channel. Preferably, at least one resource block is allocated during scheduling for transfer via a radio interface, in particular between the user device and the base station.

It is also conceivable that no resources are assigned to the data packet on the communication channel during scheduling. Furthermore, scheduling can also comprise releasing a resource block that has already been allocated, for example as part of semi-persistent scheduling. For example, scheduling can comprise deactivating a grant for a resource block. A grant can be deactivated, for example, using a Radio Resource Control message (RRC message) or a message on a Physical Downlink Shared Control Channel (PDCCH).

Scheduling may also comprise configuring or reconfiguring a scheduling method for scheduling the data packet. The scheduling method to be configured or reconfigured can, for example, be a method for dynamic scheduling, semi-persistent scheduling (SPS) or for configured grant scheduling (CG).

Scheduling can also comprise determining or selecting a modulation and coding scheme (MCS).

In the context of the present invention, a dependency of the scheduling of a data packet on a cycle information and a channel information can be understood to mean that the scheduling takes place or does not take place depending on a content of the cycle information or the channel information. It is also conceivable that the scheduling is adapted depending on the content of the cycle information or the channel information.

The scheduling is preferably carried out by a scheduling module or a scheduler, which is in particular part of a medium access layer (MAC layer) of a base station, in particular a gNodeB. In particular, the scheduling module is configured to execute the scheduling periodically.

Advantageously, the scheduling module of the computing unit comprises an uplink scheduling module and a downlink scheduling module, which are interconnected by means of a coordination layer. The coordination layer is preferably configured to exchange information between the uplink scheduling module and the downlink scheduling module in order to coordinate the scheduling of the uplink scheduling module and the downlink scheduling module according to the method according to the first aspect of the invention.

In particular, the scheduling module can be configured to discard the first and/or second data packet or to abort a transfer of the first and/or second data packet that has not yet been successfully completed if a more recent first data packet is already in the radio link control layer. It is also conceivable that the scheduling module is configured to discard the first and/or second data packet or to cancel a transfer of the first and/or second data packet that has not yet been successfully completed if a predefined transfer time for transferring the first and/or second data packet has already expired.

The method according to the invention and the computing unit according to the invention make it possible to increase the efficiency, reliability and robustness of cyclic and, in particular, time-critical wireless communication in a communication system. The proposed approach can increase the number of successfully and timely completed communication cycles and make more efficient use of transfer resources. In particular, impending application failures can be prevented if several cycles are not completed successfully in succession by adjusting the scheduling in good time, in particular by increasing the prioritization and/or robustness of the transfer. This means that applications such as sensor data-based control or regulation of a machine can be implemented safely and reliably with a control or regulation unit located remotely from the machine, even if the applications are highly time-critical.

It is advantageous if the scheduling of the first and/or second data packet takes place as a function of the first channel information relating to the first communication channel and the second channel information relating to the second communication channel. In other words, the channel information for the uplink and downlink channels is taken into account when scheduling the data packet. This design enables the scheduling to take into account the requirements of the applications with regard to cyclical communication particularly well and efficiently.

It is particularly advantageous if the scheduling of the first and second data packets takes place as a function of the first channel information relating to the first communication channel and the second channel information relating to the second communication channel. This enables a common and similar or identical prioritization of the transfer of the first and second data packets. This increases the probability that the cycle will be completed successfully, i.e., that both data packets will be transferred on time.

It is also advantageous if the cycle information comprises a time specification with regard to receiving the second data packet at the first or third end point and, depending on the time specification,

- either the scheduling comprises increasing the priority for transferring the second and preferably also the first data packet and/or selecting a modulation and coding scheme (MCS) or,
- during scheduling for the second data packet and preferably also the first data packet, no resources are allocated or resources that have already been allocated are released again on the respective communication channel.

The priority can be increased if the probability of successful transfer of the first and second data packets within a predefined time exceeds a predefined threshold value. Alternatively or additionally, the priority can be increased if the probability of successfully executing the cycle within a survival time of the application falls below a predefined threshold value or if the remaining time until the survival time expires falls below a predefined threshold value.

The resources can be released or not allocated if the probability of a successful transfer of the first and second data packets within a predefined time falls below a predefined threshold value.

Selecting the modulation and coding scheme (MCS) may comprise selecting a more robust MCS if a probability of successfully executing the cycle within a survival time of the application falls below a predefined threshold value or if the remaining time until the survival time expires falls below a predefined threshold value. The more robust MCS can, for example, allocate more resource blocks to the data packet to be transferred than the previously intended MCS in order to reduce the probability of a failure or unsuccessful transfer of the data packet.

This configuration can either increase the probability of successfully completing the cycle on time or make resources in the communication system available for other applications.

It is further advantageous if the first and/or the second channel information represent a current or anticipated transfer quality on the first and/or second communication channel and, depending on the transfer quality on the first and/or second communication channel,

- either the scheduling comprises an increase in the priority for the transfer of the second and preferably also the first data packet and/or a selection of a modulation and coding scheme (MCS) or,
- during scheduling for the second data packet and preferably also the first data packet, no resources are allocated or already allocated resources are released again on the respective communication channel.

Increasing the priority and/or selecting a modulation and coding scheme, in particular a more robust one, can take place if a probability of successful transfer of the first and second data packets within a predefined time, determined taking into account the transfer quality, exceeds a predefined threshold value. The resources can be released or not allocated if the probability of successful transfer of the first and second data packets within a predefined time, determined taking into account the transfer quality, falls below a predefined threshold value. It is conceivable that with an increasing number of packet losses, in particular consecutive packet losses, on at least one of the communication channels, the priority for the first and/or the second data packet is increased if the number of packet losses does not exceed a predefined threshold value. If the number of packet losses, in particular consecutive packet losses, exceeds the threshold value, a transfer of the first and/or second data packet is aborted or no resources are allocated for the transfer or resources that have already been allocated are released. This configuration can either increase the probability of successfully completing the cycle on time or make resources in the communication system available for other applications.

It is also advantageous if no resources are allocated for the second data packet during scheduling or if resources that have already been allocated are released again on the second communication channel if the first data packet is not successfully transferred to the second end point within a predefined time interval. This design allows the resources of the communication system to be used particularly efficiently.

BRIEF DESCRIPTION OF THE DRAWINGS

The invention will be explained in more detail in the following as an example with reference to the accompanying drawings. Shown are.

DETAILED DESCRIPTION

Figure 1:
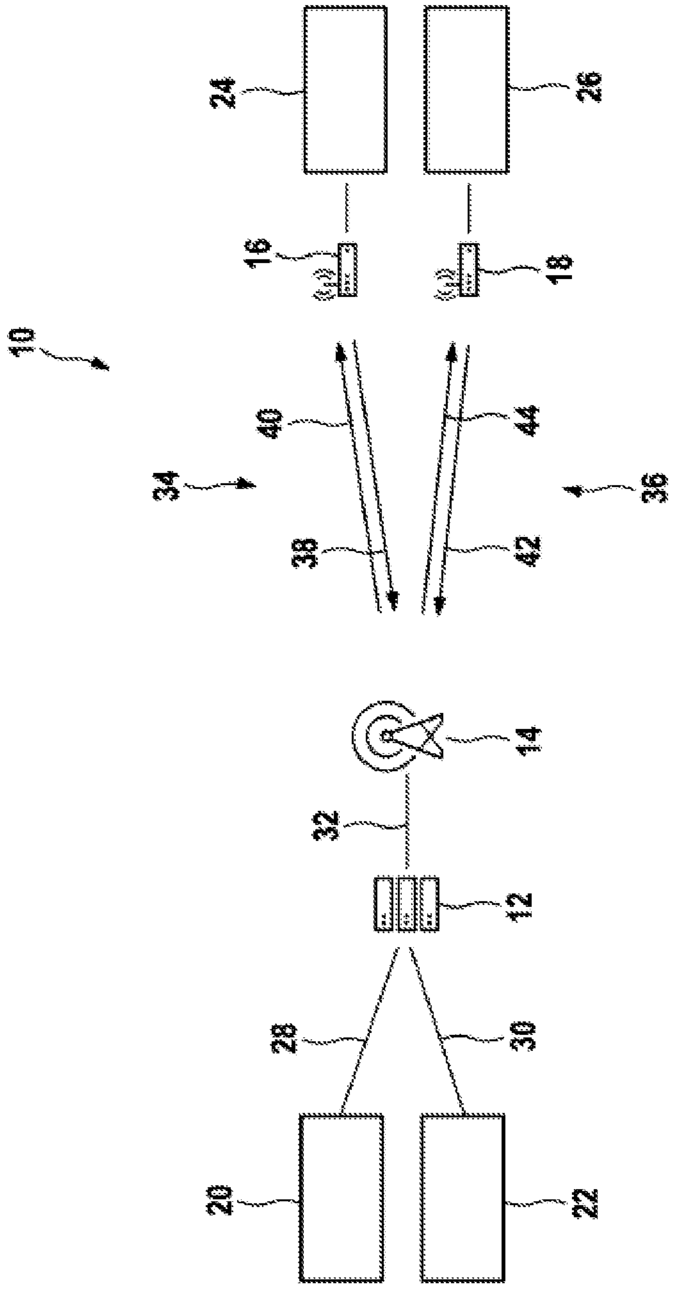
FIG. 1 a schematic representation of a communication system.

FIG. 1 shows a schematic representation of a communication system 10. The communication system 10 comprises a core network 12, a base station 14, a first user device 16 and a second user device 18. A first network-side end point 20 and a second network-side end point 22 are assigned to the core network 12. A first end point 24 on the user device side is assigned to the first user device 16. A second end point 26 on the user device side is assigned to the second user device 18.

The first network-side end point 20 and the second network-side end point 22 are each connected to the core network 12 by means of a communication link 28, 30. The core network 12 is connected to the base station 14 by means of a communication link 32, in particular a wired communication link. The first user device 16 and the second user device 18 are each connected to the base station 14 by means of a wireless communication link 34, 36. The base station 14 is designed as a gNodeB 14, for example.

The wireless communication link 34, 36 between the first user device 16 or second user device 18 and the base station 14 comprises a first communication channel 38, 42 and a second communication channel 40, 44, respectively. The first communication channel 38, 42 is configured to transfer a data packet from the first user device 16 or second user device 18 to the base station 14. The second communication channel 38, 42 is configured to transfer a data packet from the base station 14 to the first user device 16 or second user device 18.

That is, in other words, the first communication channel 38, 42 is formed as an uplink channel 38, 42. The second communication channel 40, 44 is designed as a downlink channel 40, 44. The uplink channel 38, 42 can, for example, comprise a PUCCH (Physical Uplink Control Channel) and a PUSCH (Physical Uplink Shared Channel). The downlink channel 40,44 can, for example, comprise a PDCCH (Physical Downlink Control Channel) and a PDSCH (Physical Downlink Shared Channel). The downlink channel 40, 44 can alternatively or additionally enable the transfer of RRC (Radio Resource Control Protocol) messages.

The communication system 10 enables cyclic wireless communication between the first network-side end point 20 and the first user-device-side end point 24, and between the second network-side end point 22 and the second user-device-side end point 26.

A cycle of communication of an application or application comprises, for example, a transfer of a first data packet on the first communication channel 38 from the first user device-side end point 24 to the first network-side end point 20 and a transfer of a second data packet on the second communication channel 40 from the first network-side end point 20 to the first user device-side end point 24. The second data packet is sent after the first data packet has been received.

A cycle of communication of a further application or further application comprises, for example, a transfer of a first data packet on the first communication channel 42 from the second user device-side end point 26 to the second network-side end point 22 and a transfer of a second data packet on the second communication channel 44 from the second network-side end point 22 to the second user device-side end point 26. Here too, the second data packet is sent after the first data packet has been received. Here too, the second data packet is sent after the first data packet has been received.

Alternatively or additionally, a cycle of communication of the further application or the further application may comprise, for example, a transfer of a first data packet on the first communication channel 40 from the first user-device-side end point 24 to the first network-side end point 20 and a transfer of a second data packet on the second communication channel 44 from the first network-side end point 20 to the second user-device-side end point 26. Here too, the second data packet is sent after the first data packet has been received.

According to this exemplary embodiment, the applications use the same base station 14 and the same radio access network.

It is conceivable that the first data packet comprises sensor data and the second data packet comprises control data. The control data of the second data packet can be generated or determined taking into account the sensor data of the first data packet.

Figure 2:
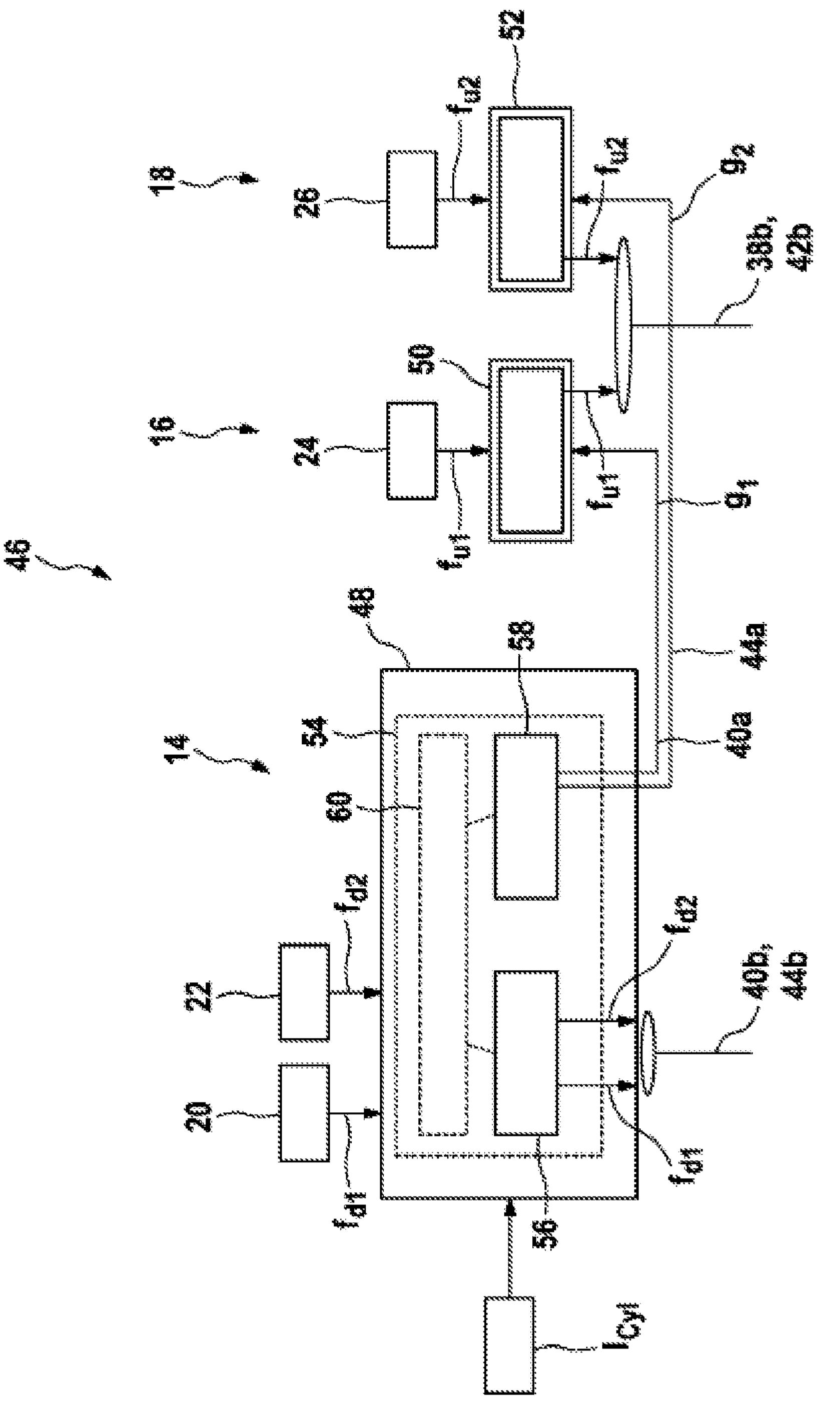
FIG. 2 a schematic representation of an architecture for scheduling a data packet.

The base station 14 comprises a computing unit with a scheduling module for joint scheduling of the first data packet and the second data packet, as described in FIG. 2.

FIG. 2 shows a schematic representation of an architecture for the joint scheduling of a first data packet $f_{u1}$, $f_{u2}$ and a second data packet $f_{d1}$, $f_{d2}$ for a communication system 10 according to FIG. 1. The architecture is marked in its entirety with reference number 46.

The MAC unit (Medium Access Unit) 48 of the base station 14 is shown on the left-hand side of FIG. 2. In the right part of FIG. 3, the MAC unit 50 of the first user device 16 and the MAC unit 52 of the second user device 18 are shown.

The MAC unit 48 of the base station 14 comprises a scheduling module 54. According to a first alternative, the scheduling module comprises a downlink scheduler 56, an uplink scheduler 58 and a coordination layer 60 configured to coordinate the downlink scheduler 56 and the uplink scheduler 58 with each other by exchanging information between the schedulers 56, 58. According to a second alternative, the scheduling module 54 comprises a common scheduler for the uplink channels 38, 42 and the downlink channels 40, 44.

The scheduling module 54 is associated with a storage unit, for example a database, which is configured to store a cycle information $I_{cyl}$ preferably provided by the first or the second user device 16, 18. The scheduling module 54 has an interface for reading out the cycle information $I_{cyl}$ stored in the memory unit.

The cycle information $I_{cyl}$ comprises, for example, information regarding the periodicity of the cycle, a packet size, a priority, a burst arrival time and an identification number for the first and second data packet respectively. The cycle information $I_{cyl}$ can in particular comprise Time-Sensitive Communication Assistance Information (TSCAI).

The cycle information $I_{cyl}$ further comprises an indication between which end points 20, 22, 24, 26 of the communication system and in which order the first and second data packets are transferred, as well as a survival time of the application on which the cycle is based. It is also conceivable that the cycle information $I_{cyl}$ comprises a Buffer Status Report (BSR).

The scheduling module 54 is configured to receive a first channel information relating to the uplink channel 38, 42 and a second channel information relating to the downlink channel 40, 44. The channel information may comprise one or more measured variables relating to the uplink channel 38, 42 and the downlink channel 40, 44. Preferably, the channel information comprises one or more quality of service parameters, e.g., a data rate, a HARQ status or packet error statistics, a radio channel information or a channel quality indicator (CQI) representing a signal strength, e.g., a signal-to-noise ratio, of the communication channel 38, 40, 42, 44, an average and/or maximum and/or currently achievable data rate on the respective communication channel 38, 40, 42, 44.

The scheduling module 54 is further configured for scheduling the first data packet $f_{u1}$, $f_{u2}$ depending on the cycle information $I_{cyl}$, the first channel information relating to the uplink channel 38, 42 and the second channel information relating to the downlink channel 40, 44. The scheduling module 54 is also configured for scheduling the second data packet $f_{d1}$, $f_{d2}$ depending on the cycle information $I_{cyl}$, the first channel information relating to the uplink channel 38, 42 and the second channel information relating to the downlink channel 40, 44. Thus, the scheduling module 54 is configured to coordinate a transfer of the data packets $f_{u1}$, $f_{u2}$, $f_{d1}$, $f_{d2}$ on the downlink channel 40, 44 and a configuration and/or (de)activation of grants $g_1$, $g_2$ for the uplink channel 38, 42 in accordance with the method described in FIG. 3.

In this case, the scheduling module 54 is configured to activate or deactivate a grant $g_1$, $g_2$ by means of the PDCCH 40*a*, 44*a* or an RRC message to the respective MAC unit 50, 52 of the user device 16, 18 for the transfer of the respective first data packet $f_{u1}$, $f_{u2}$ on the PUSCH 38*b*, 42*b* of the communication channel 38, 42*b*. In the case of a CG scheduling method for transferring on the PUSCH 38*b*, 42*b*, the grants $g_1$, $g_2$ are initially preconfigured by means of an RRC message based on the periodicity of the cycle and the packet size of the first data packet.

Furthermore, the scheduling module 54 is configured to allocate resources on the PDSCH 40*b*, 44*b* of the communication channel 40, 44 for the transfer of the second data packet $f_{d1}$, $f_{d2}$ in each case.

Figure 3:
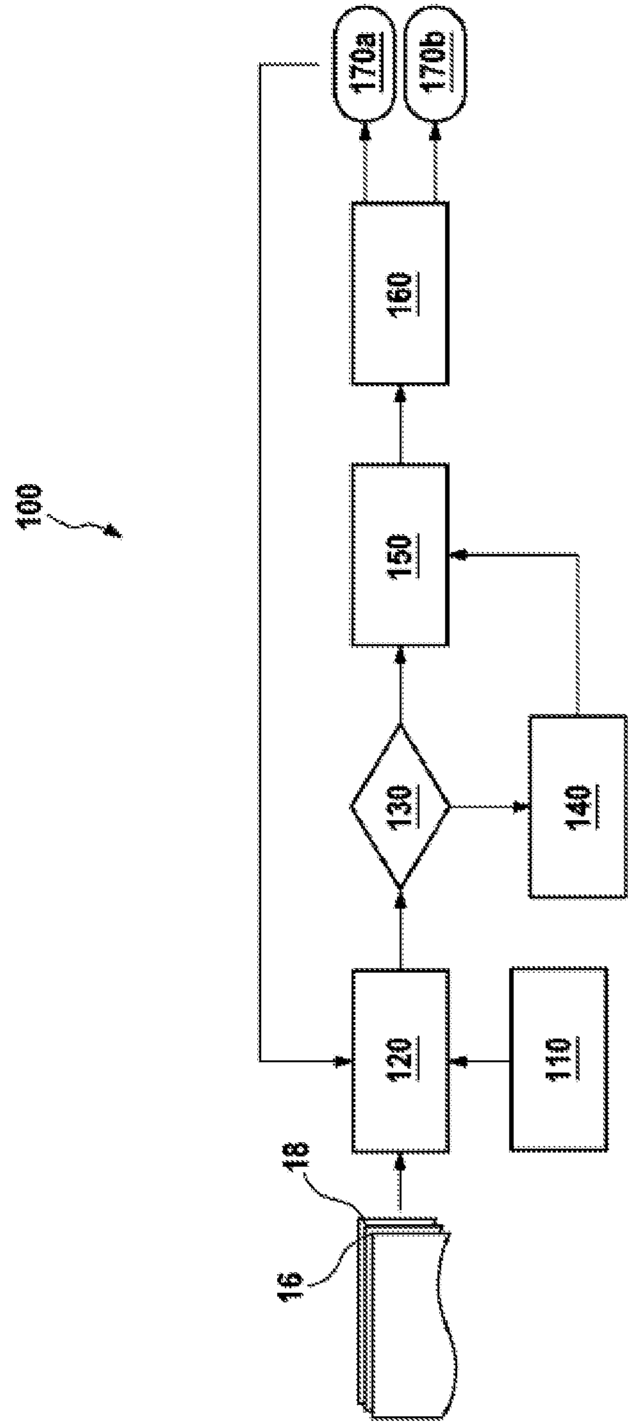
FIG. 3 a flow chart of a method for scheduling a data packet.

FIG. 3 shows a flow chart of a method for jointly scheduling a first data packet $f_{u1}$, $f_{u2}$ and a second data packet $f_{d1}$, $f_{d2}$ for a communication system 10 according to FIG. 1. The method is provided in its entirety with the reference number 100.

In step 110, a cycle information $I_{cyl}$ relating to the cycle of the communication is provided to the scheduling module 54, in particular to the memory unit associated with the scheduling module 54. Preferably, the cycle information $I_{cyl}$ is provided by the first user device 16 and/or the second user device 18.

If the application on which the cycle is based changes or a cycle of another application begins, updated or additional cycle information $I_{cyl}$ can be provided and stored in the memory unit. This allows the scheduling to be adapted to the application at runtime.

User devices that are not comprised in the stored cycle information $I_{cyl}$ are treated as belonging to a non-cyclical application and are taken into account in the known scheduling methods.

In step 120, a first channel information relating to the first communication channel 38, 42 and/or a second channel information relating to the second communication channel 40, 44 is received by means of the scheduling module 54. The first and/or second channel information may comprise one or more measured values of one or more transfer parameters of a transfer of data packets on the respective communication channel 38, 40, 42, 44.

It is conceivable that the first channel information represents the same quantity for the first communication channel 38, 42 that the second channel information represents for the second communication channel 40, 44.

In step 130, the scheduling module 54 is used to determine whether a configuration of a scheduling method or a reconfiguration of an already configured scheduling method is required. The determination is based, for example, on an updated TSCAI provided by a 5G Application Function (AF) or a 5G Network Exposure Function (NEF).

In the event that a configuration of a scheduling method or a reconfiguration of an already configured scheduling is required, the scheduling method is configured or the already configured scheduling method is reconfigured in step 140.

Here, a semi-persistent scheduling method (PLC scheduling) or a dynamic scheduling method known to a person skilled in the art is configured for the downlink channel 40, 44.

For the uplink channel 38, 42, a type 2 Configured Grant Scheduling method (type 2 CG scheduling) known to the skilled person is configured, see section 5.8.2 of the technical specification according to 3GPP standard "TS 38.321 Medium Access Control (MAC) protocol specification V16.3.0" with upload date Jan. 6, 2021. The CG scheduling method can be configured by means of an RRC message from the base station 14 to the respective user device 16, 18. Up to twelve different configurations are possible, which can be activated and deactivated individually.

In step 150, the second data packet $f_{d1}$, $f_{d2}$ is scheduled depending on the cycle information $I_{cyl}$ relating to the cycle and the first channel information relating to the first communication channel 38, 42. Preferably, the first data packet $f_{u1}$, $f_{u2}$ is also scheduled in step 150 as a function of the cycle information $I_{cyl}$ and the second channel information relating to the second communication channel 40, 44. Particularly preferred is the scheduling of the respective data packets $f_{u1}$, $f_{u2}$, $f_{d1}$, $f_{d2}$ in each case depending on the first and second channel information. In other words, the first and second data packets $f_{u1}$, $f_{u2}$, $f_{d1}$, $f_{d2}$ are scheduled together, taking into account a channel state of both communication channels 38, 40, 42, 44.

Various scheduling and prioritization metrics are conceivable for the scheduling in step 150, which take into account the dependency of the second data packet $f_{d1}$, $f_{d2}$ on the first data packet $f_{u1}$, $f_{u2}$ or the cyclicality of the communication.

According to an exemplary embodiment, a priority for the transfer of the first or, in particular, the second data packet $f_{u1}$, $f_{u2}$, $f_{d1}$, $f_{d2}$ can be increased by means of the scheduling module 54 in the event of a reduction in the transfer quality, for example in the event of an increased packet loss rate, on the first and/or the second communication channel 38, 40, 42, 44.

According to a further exemplary embodiment, the scheduling module 54 can be used to increase a priority for the transfer of the first or, in particular and, the second data packet $f_{u1}$, $f_{u2}$, $f_{d1}$, $f_{d2}$ if the probability of successfully executing the cycle within the survival time of the application falls below a predefined threshold value or if the remaining time until the survival time expires falls below a predefined threshold value.

According to a further exemplary embodiment, no further resources can be allocated for the second data packet $f_{d1}$, $f_{d2}$ and preferably also the first data packet $f_{u1}$, $f_{u2}$ for the current cycle or already allocated resources can be released again on the respective communication channel 38, 40, 42, 44 if the probability for the successful execution of the cycle falls below a predefined threshold value and in particular if a transfer of the first data packet $f_{u1}$, $f_{u2}$ has already failed. In particular, no resources are allocated for the second data packet $f_{d1}$, $f_{d2}$ for the current cycle or resources already allocated on the second communication channel 40, 44 are released again, for example by deactivating a grant $g_1$, $g_2$, if the first data packet $f_{u1}$, $f_{u2}$ could not be transferred.

According to a further exemplary embodiment, a communication cycle can be skipped or aborted if a transfer quality, in particular a data rate available for the cycle, falls below a threshold value, for example due to increased channel utilization.

For the possibility of skipping or aborting a cycle without exceeding the survival time of the application, the survival time should be at least twice the period duration of the cycle.

In step 160, resources are allocated according to the scheduling in step 150 and the (re)configured scheduling method in step 140.

For the downlink channel 40, 44, an assignment of a resource determined in step 160 is transferred to the physical layer for sending the data packet in step 170*a*. For the uplink channel 38, 42, activation or deactivation commands for the grants $g_1$, $g_2$ determined and already issued in step 160 are transferred via the PDCCH channel in step 170*b*.

The method is continued in step 120.

The invention claimed is:

1. A method (100) for scheduling (150) a data packet ($f_{u1}$, $f_{u2}$, $f_{d1}$, $f_{d2}$) for a cyclic wireless communication in a communication system (10), the method comprising:

a cycle of communication including transferring a first data packet ($f_{u1}$, $f_{u2}$) on a first communication channel (38, 42) from a first end point (24, 26) to a second end point (20, 22) and transferring a second data packet ($f_{d1}$, $f_{d2}$) on a second communication channel (40, 44) from the second end point (20, 22) to the first end point (24, 26) or a third end point (24, 26), and (i) scheduling (150) of the second data packet ($f_{d1}$, $f_{d2}$) as a function of a cycle information ($I_{Cyl}$) relating to the cycle and a first channel information relating to the first communication channel (38, 42), (ii) scheduling (150) of the first data packet ($f_{u1}$, $f_{u2}$) as a function of the cycle information ($I_{Cyl}$) and a second channel information relating to the second communication channel (40, 44), or (iii) performing both (i) and (ii).

2. The method (100) according to claim 1, wherein the scheduling (150) of the first data packet ($f_{u1}$, $f_{u2}$) and/or second data packet ($f_{d1}$, $f_{d2}$) is carried out as a function of the first channel information relating to the first communication channel (38, 42) and the second channel information relating to the second communication channel (40, 44).

3. The method (100) according to claim 1, wherein the cycle information ($I_{Cyl}$) comprises a time specification with regard to receiving the second data packet ($f_{d1}$, $f_{d2}$) at the first or third end point (24, 26) and, depending on the time specification, either the scheduling (150) comprises selecting a modulation and coding scheme (MCS) and/or increasing a priority for transferring the second data packet ($f_{d1}$, $f_{d2}$), or during scheduling (150), no resources are allocated for the second data packet ($f_{d1}$, $f_{d2}$), or already allocated resources are released again on the respective communication channel (38, 40, 42, 44).

4. The method (100) according to claim 1, wherein the first channel information and/or the second channel information represent a current or expected transfer quality on the first communication channel (38, 42) and/or second communication channel (40, 44), respectively, and depending on the transfer quality on the first communication channel (38, 42) and/or second communication channel (40, 44), either the scheduling (150) comprises selecting a modulation and coding scheme (MCS) and/or increasing a priority for the transfer of the second data packet ($f_{d1}$, $f_{d2}$), or during scheduling (150), no resources are allocated for the second data packet ($f_{d1}$, $f_{d2}$), or already allocated resources are released again on the respective communication channel (38, 40, 42, 44).

5. The method (100) according to claim 1, wherein, during scheduling (150), no resources are allocated for the second data packet ($f_{d1}$, $f_{d2}$) or already allocated resources are released again on the second communication channel (40, 44) if the first data packet ($f_{u1}$, $f_{u2}$) is not successfully transferred to the second end point (20, 22) within a predefined time interval.

6. A computing unit having a scheduling module (54) for scheduling (150) a data packet ($f_{u1}$, $f_{u2}$, $f_{d1}$, $f_{d2}$) for cyclic wireless communication in a communication system (10), wherein a cycle of the communication comprises transferring a first data packet ($f_{u1}$, $f_{u2}$) on a first communication channel (38, 42) from a first end point (24, 26) to a second end point (20, 22) and transferring a second data packet (fd1, fd2) on a second communication channel (40, 44) from the second end point (20, 22) to the first end point (24, 26) or a third end point (24, 26), and the scheduling module (54) is configured for scheduling (150):

(i) the second data packet ($f_{d1}$, $f_{d2}$) as a function of a cycle information ($I_{Cyl}$) relating to the cycle and a first channel information relating to the first communication channel (38, 42), (ii) the first data packet ($f_{u1}$, $f_{u2}$) as a function of the cycle information ($I_{Cyl}$) and a second channel information relating to the second communication channel (40, 44), or (iii) both (i) and (ii).

7. The computing unit according to claim 6, wherein the scheduling module (54) comprises an uplink scheduling module (58) and a downlink scheduling module (56), which are interconnected by means of a coordination layer (60).

8. A base station (14) with a computing unit according to claim 6.

9. A user device (16, 18) for cyclic wireless communication in a communication system (10), wherein a cycle of the communication comprises transferring a first data packet ($f_{u1}$, $f_{u2}$) on a first communication channel (38, 42) from a first end point (24, 26) to a second end point (20, 22) and transferring a second data packet (fd1, fd2) on a second communication channel (40, 44) from the second end point (20, 22) to the first end point (24, 26) or a third end point (24, 26), and the first or second end point (24, 26) is assigned to the user device (16, 18), the user device (16, 18) is configured to provide a base station (14) with cycle information ($I_{Cyl}$) relating to the cycle of the communication and to transfer the first data packet ($f_{u1}$, $f_{u2}$) and/or second data packet ($f_{d1}$, $f_{d2}$) based on scheduling (150) performed by the base station (14) the scheduling (150) comprising:

(i) scheduling (150) of the second data packet (fd1, fd2) as a function of the cycle information ($I_{Cyl}$) relating to the cycle and a first channel information relating to the first communication channel (38, 42), (ii) scheduling (150) of the first data packet (fu1, fu2) as a function of the cycle information (ICyl) and a second channel information relating to the second communication channel (40, 44), or (iii) performing both (i) and (ii).

10. A non-transitory computer-readable medium containing instructions that when executed by a computer cause the computer to schedule (150) a data packet ($f_{u1}$, $f_{u2}$, $f_{d1}$, $f_{d2}$) for a cyclic wireless communication in a communication system (10), by:

performing a cycle of communication that includes transferring a first data packet ($f_{u1}$, $f_{u2}$) on a first communication channel (38, 42) from a first end point (24, 26) to a second end point (20, 22) and transferring a second data packet (fd1, fd2) on a second communication channel (40, 44) from the second end point (20, 22) to the first end point (24, 26) or a third end point (24, 26), and (i) scheduling (150) the second data packet ($f_{d1}$, $f_{d2}$) as a function of a cycle information ($I_{Cyl}$) relating to the cycle and a first channel information relating to the first communication channel (38, 42), (ii) scheduling (150) of the first data packet ($f_{u1}$, $f_{u2}$) as a function of the cycle information ($I_{Cyl}$) and a second channel information relating to the second communication channel (40, 44), or (iii) performing both (i) and (ii).

* * * * *